(12) United States Patent
Barbou-Des-Places et al.

(10) Patent No.: US 9,195,581 B2
(45) Date of Patent: Nov. 24, 2015

(54) TECHNIQUES FOR MOVING DATA BETWEEN MEMORY TYPES

(75) Inventors: Francois Barbou-Des-Places, Burlingame, CA (US); Neil G. Crane, Palo Alto, CA (US); Lionel D. Desai, San Francisco, CA (US); Joseph Sokol, Jr., San Jose, CA (US)

(73) Assignee: Apple Inc., Cupertino, CA (US)

( * ) Notice: Subject to any disclaimer, the term of this patent is extended or adjusted under 35 U.S.C. 154(b) by 319 days.

(21) Appl. No.: 13/175,303

(22) Filed: Jul. 1, 2011

(65) Prior Publication Data

US 2013/0007345 A1 Jan. 3, 2013

(51) Int. Cl.
*G06F 9/46* (2006.01)
*G06F 12/02* (2006.01)
*G06F 12/08* (2006.01)
*G06F 12/12* (2006.01)

(52) U.S. Cl.
CPC ............ *G06F 12/0246* (2013.01); *G06F 9/461* (2013.01); *G06F 12/08* (2013.01); *G06F 12/126* (2013.01)

(58) Field of Classification Search
None
See application file for complete search history.

(56) References Cited

U.S. PATENT DOCUMENTS

| | | | | |
|---|---|---|---|---|
| 5,251,303 A | * | 10/1993 | Fogg et al. | 710/24 |
| 5,497,476 A | * | 3/1996 | Oldfield et al. | 711/112 |
| 6,038,571 A | * | 3/2000 | Numajiri et al. | |
| 6,640,285 B1 | * | 10/2003 | Bopardikar et al. | 711/133 |
| 6,654,428 B1 | * | 11/2003 | Bose et al. | 375/316 |
| 6,934,755 B1 | * | 8/2005 | Saulpaugh et al. | 709/226 |
| 6,957,237 B1 | * | 10/2005 | Traversat et al. | |
| 2003/0061457 A1 | * | 3/2003 | Geiger et al. | 711/165 |
| 2005/0086442 A1 | * | 4/2005 | McBrearty et al. | 711/159 |
| 2005/0246513 A1 | | 11/2005 | Oba | |
| 2006/0028947 A1 | * | 2/2006 | Elliott et al. | 369/53.41 |
| 2008/0320203 A1 | | 12/2008 | Fitzgerald | |
| 2010/0332693 A1 | * | 12/2010 | Ben-Yehuda et al. | 710/22 |
| 2011/0022799 A1 | | 1/2011 | Sugahara | |
| 2011/0082965 A1 | * | 4/2011 | Koka et al. | 711/103 |
| 2011/0145447 A1 | * | 6/2011 | Dimond | 710/23 |
| 2011/0173395 A1 | * | 7/2011 | Bhattacharjee et al. | 711/135 |

FOREIGN PATENT DOCUMENTS

| | | |
|---|---|---|
| JP | 2003076606 | 3/2003 |
| JP | 2007013481 | 1/2007 |
| JP | 2008217208 | 9/2008 |

(Continued)

OTHER PUBLICATIONS

A Dwarf. "Any reason not to disable Windows kernel paging?" Sep. 2009. http://superuser.com/questions/41439/any-reason-not-to-disable-windows-kernel-paging.*

(Continued)

*Primary Examiner* — Nathan Sadler
(74) *Attorney, Agent, or Firm* — Downey Brand LLP

(57) ABSTRACT

A two-level paging mechanism. The first level gathers data from reclaimable memory locations for a process and compacts the data into a single container. The second level sends the compact container's contents to a swap file and may use optimal I/O operations to the target memory device. On-demand paging is made possible by having a first pager locate the requested data in the compact container and then having a second pager retrieve the corresponding data from the swap file.

27 Claims, 5 Drawing Sheets

(56) References Cited

FOREIGN PATENT DOCUMENTS

| JP | 2009503627 | 1/2009 |
|----|-----------|--------|
| JP | 2011028537 | 2/2011 |

OTHER PUBLICATIONS

Bernard S. Greenberg and Steven Webber. "The Multics Multilevel Paging Hierarchy." 1975. IEEE Intercon.*

Michael Ismert. "Making Commodity PCs Fit for Signal Processing." Jun. 1998. USENIX. No. 98.*

Jason Parker. "Symbian OS Internals/02. Hardware for Symbian OS." Jan. 2011. http://www.developer.nokia.com/Community/Wiki/index.php?title=Symbian_OS_Internals/02._Hardware_for_Symbian_OS&oldid=83584.*

Phillip Krueger and Rohit Chawla. "The Stealth Distributed Scheduler." May 1991. IEEE. ICDCS 1991. pp. 336-343.*

Walling. "ATA/ATAPI using DMA." Feb. 2009. http://wiki.osdev.org/index.php?title=ATA/ATAPI_using_DMA&oldid=7174.*

Bovet et al. Understanding the Linux Kernel. Dec. 2002. O'Reilly. $2^{nd}$ ed. Section 13.4.*

Joo et al. "Demand Paging for OneNAND™ Flash eXecute-In-Place." Oct. 2006. ACM. CODES+ISSS '06. pp. 229-234.*

PCT Search Report; Application No. PCT/US2012/044351, dated Oct. 24, 2012.

PCT Written Opinion; Application No. PCT/US2012/044351, dated Oct. 24, 2012.

* cited by examiner

TECHNIQUES FOR MOVING DATA BETWEEN MEMORY TYPES

TECHNICAL FIELD

Embodiments of the invention relate to transfer of data between memory types. More particularly, embodiments of the invention relate to techniques for moving data from a volatile memory to a non-volatile memory.

BACKGROUND

Electronic devices include a finite amount of memory. Volatile memory types are typically faster than non-volatile memory. Thus, volatile memory is typically used for applications that require minimal memory latency. However, because the volatile memory is finite, there may be conditions that require removing data from the volatile memory to allow other applications or processes to utilize additional memory locations.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

On a device with a limited amount of volatile memory (e.g., random access memory, RAM), it may be desirable or even necessary to allocate memory locations used for one process or application to another process or application. For example, a more important application may require more memory locations at the expense of a less important application.

In one embodiment, when the non-volatile memory is a solid-state memory device, it may be desirable to minimize the wear on the device and avoid read/modify/write situations. In one embodiment, the process or application is allowed access to the data after it has been evicted from the volatile memory and has been moved to the non-volatile memory.

In one embodiment, a two-level paging mechanism is used. The first level gathers pages from reclaimable memory locations for a process and compacts the pages into a single container. The second level sends the compact container's contents to a swap file and may use optimal I/O operations to the target memory device. On-demand paging is made possible by having a first pager locate the requested pages in the compact container and then having a second pager retrieve the corresponding pages from the swap file.

This two-level paging mechanism may be useful, for example, in mobile devices that typically have less RAM than physically larger devices, such as desktop computers or even laptop computers. For example, a tablet device, or a notebook computer, or a smartphone may contain a limited amount of RAM and a solid state memory device (e.g., flash memory).

Figure 1:
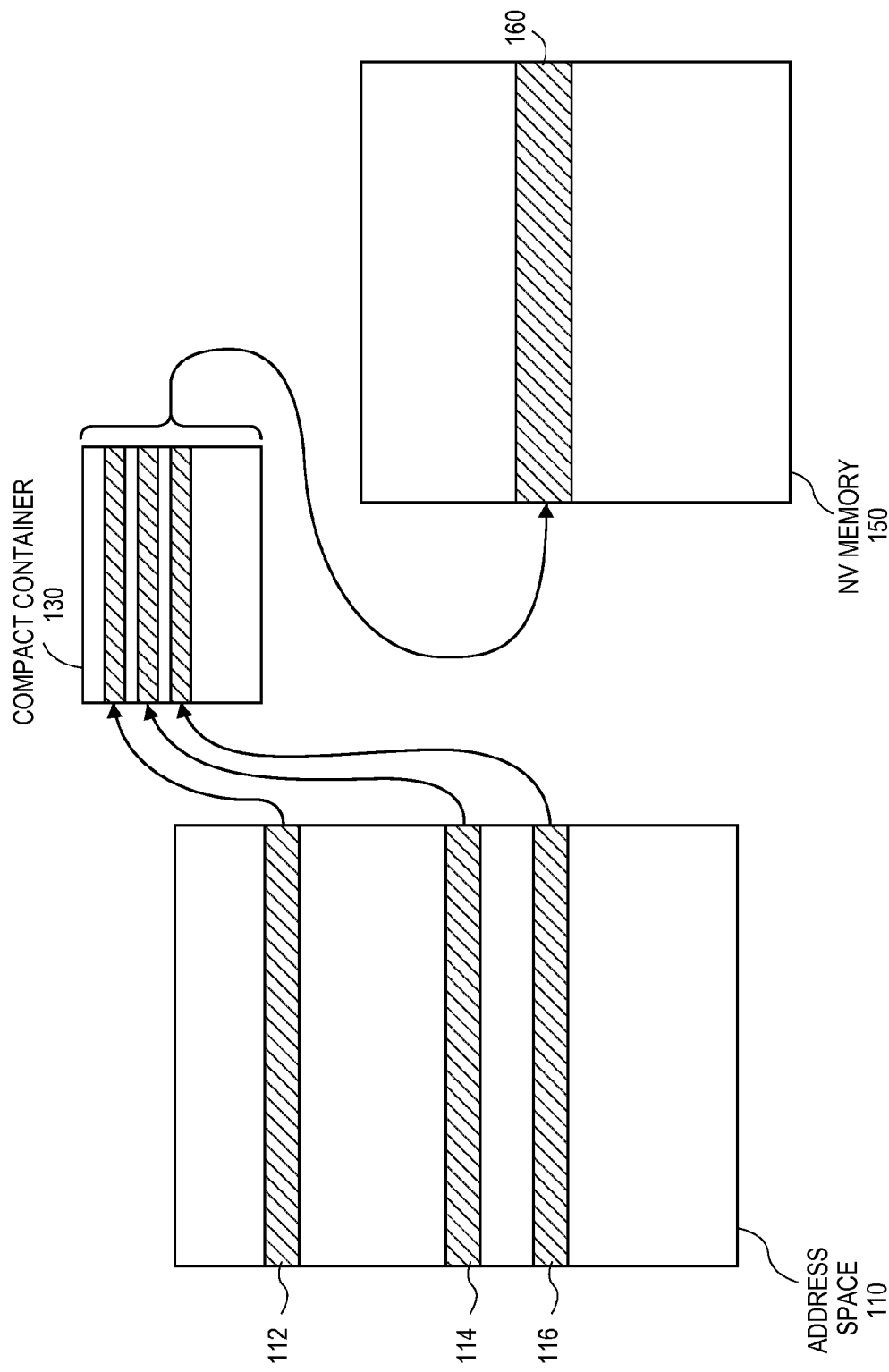
FIG. 1 is a conceptual diagram of data movement between a first memory and a second memory.

FIG. 1 is a conceptual diagram of data movement between a first memory and a second memory. The techniques described herein may be generally applicable, but the examples are provided generally for movement of pages between a main memory (e.g., DRAM) and a larger storage devices (e.g., flash memory).

Address space 110 represents the memory that can be used by a given process or application. Address space 110 can contain several memory regions. A memory region can contain several virtual pages. A virtual page can be in one of three states at any time: Unallocated, Resident, or Paged Out.

The primary (RAM, volatile) and secondary (SSD, non-volatile) memories are used by multiple applications during execution of the applications by a host system. Typically, primary memory is a random access memory that is accessible by a processor(s) executing the applications. Address space 110 may use all of, or part of, a random access memory within the host system. Other address spaces are used to support the other processes in the system and they all compete for the limited resources of the primary memory (RAM).

The random access memory is used to support multiple processes and each process may have its own address space to utilize. Address space 110 has one or more memory regions (e.g., 112, 114, 116) that are used by the process to store one or more pages of data.

In the example of FIG. 1, memory regions 112, 114 and 116 may be assigned to a process. In one embodiment, each process has an associated priority that may be used, for example, to resolve resource conflicts. For example, when a process needs additional memory locations and insufficient memory is available, a process with a lower priority may have some or all of its pages evicted so that the memory regions may be reallocated to the higher priority process.

Thus, during operation, memory regions 112, 114 and 116 may be designated for eviction. The eviction process moves the pages from memory regions 112, 114 and 116 to non-volatile memory 150. In one embodiment, this process includes utilization of compact container 130. Compact container 130 may be a region or structure in system RAM outside of address space 110, or compact container 130 may be in a different memory device coupled with system RAM. In one embodiment, compact container 130 is within an operating system kernel address space.

In one embodiment, the pages from memory regions 112, 114 and 116 are stored in a more compact manner (e.g., contiguously, in a minimal number of pages, etc.) within compact container 130. In another embodiment, pointers to the pages may be stored in compact container 130. In one embodiment, the contents of memory regions 112, 114 and 116 are copied to non-volatile memory 150. In one embodiment, the pages are copied to non-volatile memory 150 in a single write operation, or in a single write operation per page.

When pages that have been moved to non-volatile memory 150 are required, the location of the data in non-volatile memory 150 may be determined through compact container 130. The pages may then be transferred back from non-volatile memory 150 to address space 110. The same memory regions may be used, or different memory regions may be used.

Figure 2:
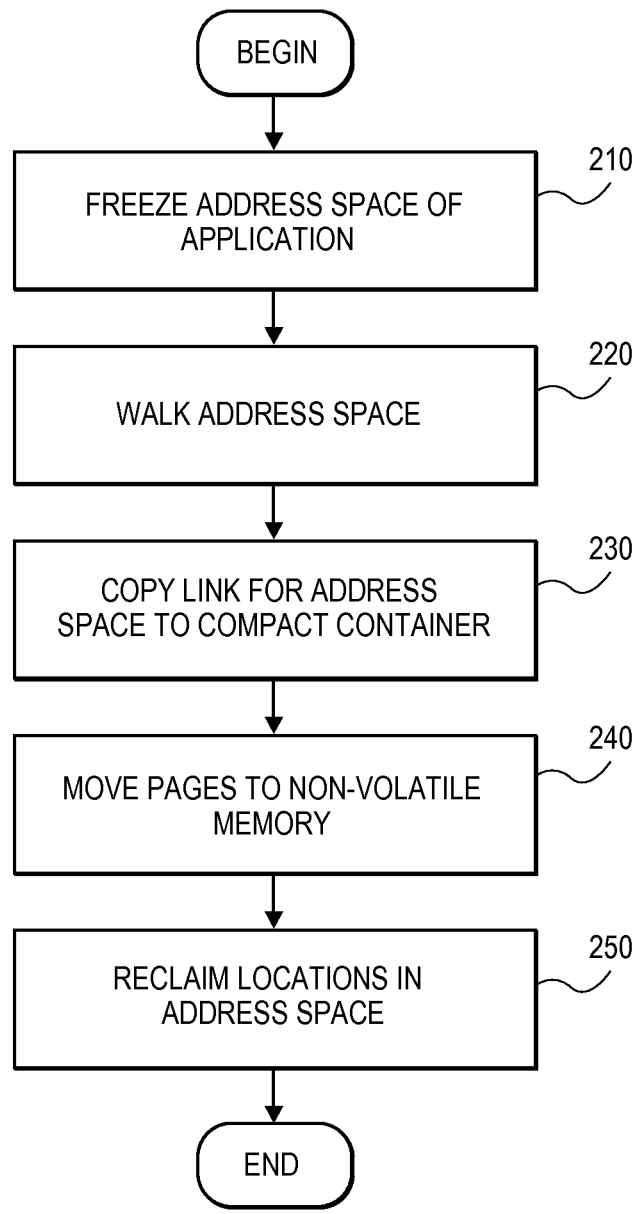
FIG. 2 is a flow diagram of one embodiment of a technique for data movement between a first memory and a second memory.

FIG. 2 is a flow diagram of one embodiment of a technique for data movement between a first memory and a second memory. The technique of FIG. 2 may be utilized, for example, to transfer pages between memory types as illustrated in FIG. 1.

When pages for a process are designated for eviction, the address space corresponding to the process is frozen (e.g., 112, 114, 116 of FIG. 1), at step 210. When the address space is frozen the process is prevented from writing to the memory locations and changing the contents of the memory locations. Thus, the contents of the memory to be transferred will be coherent with the process.

The address space for the process is walked, at step 220. When walking the address space for the process, information is collected about the pages of memory that are frozen and to be transferred out of RAM. In one embodiment, for pages that are to be transferred out of RAM, pointers for the resident pages are moved to the compact container, at step 230. In another embodiment, the contents of the memory locations may be copied to the compact container to be transferred out of RAM. In one embodiment, pages that share data between multiple processes are not candidates for eviction.

The pages are then copied from RAM to the non-volatile memory (e.g., flash memory), at step 240. In one embodiment, the pages are written to the non-volatile memory in a single I/O operation, which may help reduce wear on the non-volatile memory. In alternate embodiments, multiple write operations may be performed.

The address space locations for which the pages have been moved are reclaimed, at step 250. The reclaimed memory locations can then be used by other processes. The process of FIG. 2 can be repeated for other processes as well.

Figure 3:
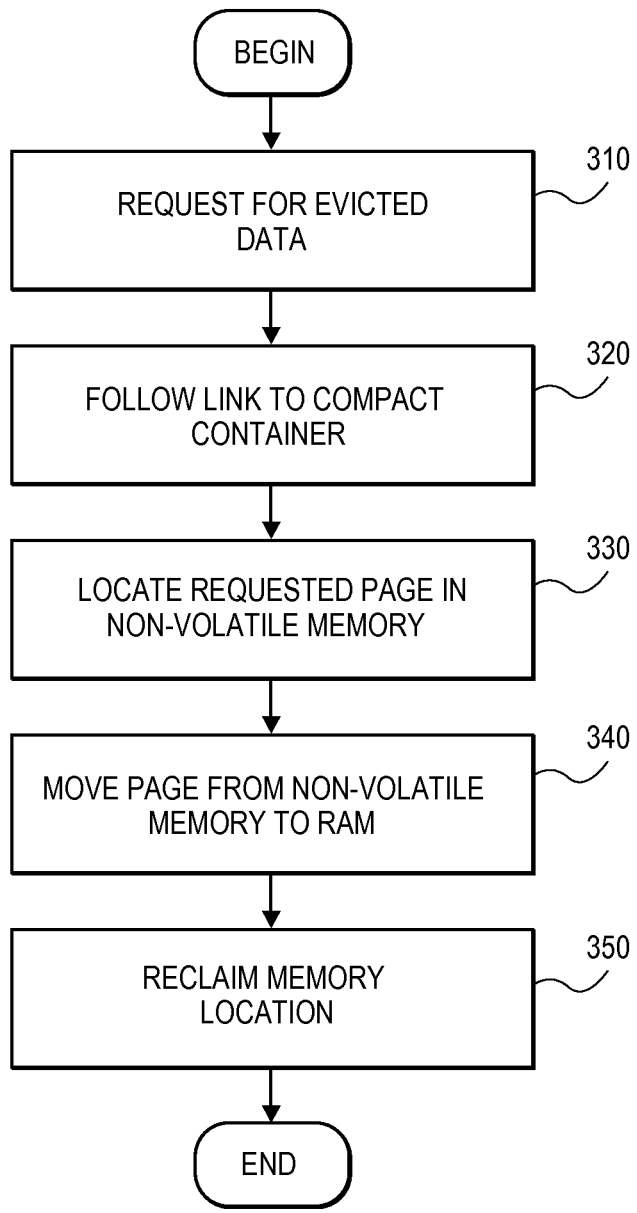
FIG. 3 is a flow diagram of one embodiment of a technique for transferring data from a first memory to a second memory.

FIG. 3 is a flow diagram of one embodiment of a technique for transferring data from a non-volatile memory to a RAM. The process of FIG. 3 may be used, for example, to retrieve pages from a flash memory when a process has been previously frozen and/or data has been evicted, for example, as described above with respect to FIG. 2.

A request is received for the evicted pages, at step 310. The request may be the result of a reactivation, or thawing, of a previously frozen process. The request may be for a portion of the previously evicted pages for the process, or the request may be for all of the previously evicted pages for the process.

The link for the memory locations in the address space (e.g., in RAM) to the compact container are followed, at step 320. The link and/or other information may be utilized to determine the location and/or status of the data in the compact container. The page location is determined, at step 330.

The pages are then copied from the non-volatile memory to RAM, at step 340. In one embodiment, the pages are retrieved by a single read to the non-volatile memory. The non-volatile memory locations can then be used for other data, at step 350.

Figure 4:
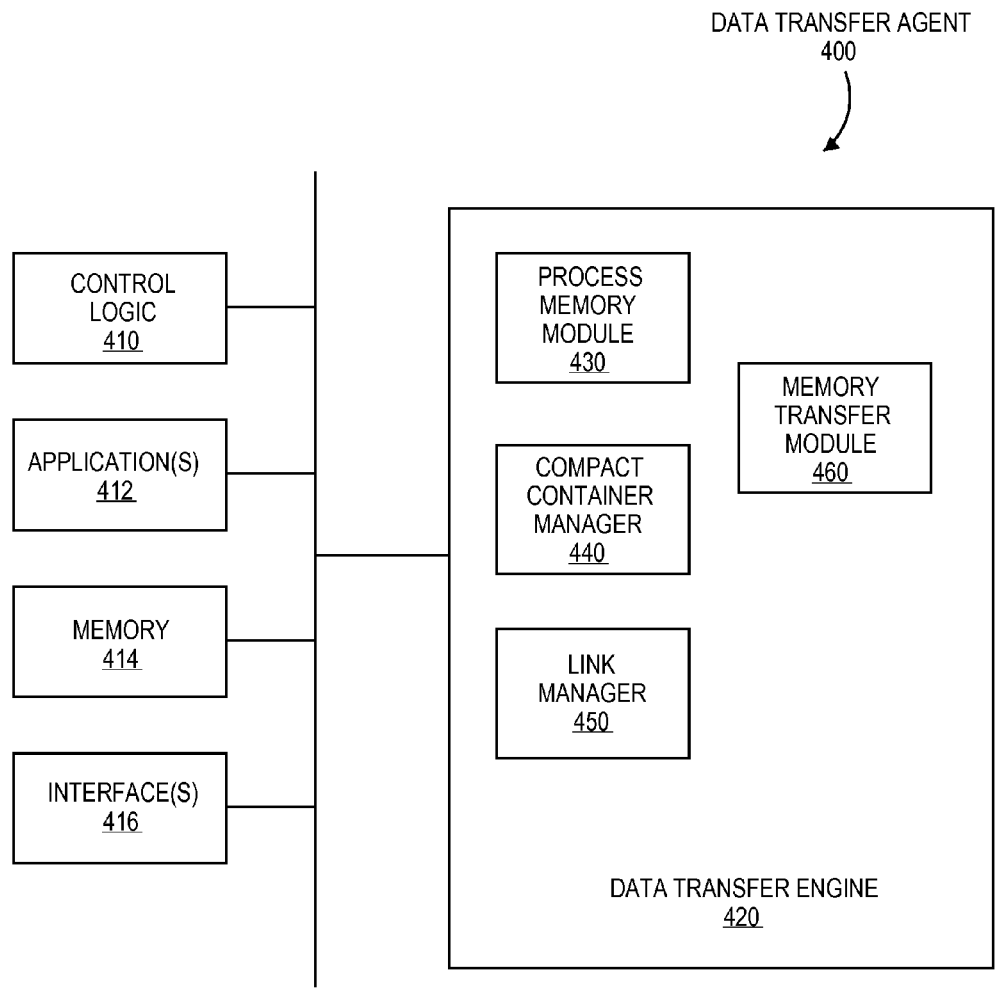
FIG. 4 is a block diagram of one embodiment of an agent for managing data movement between a first memory and a second memory.

FIG. 4 is a block diagram of one embodiment of an agent for managing data movement between a first memory and a second memory. Data transfer agent 400 includes control logic 410, which implements logical functional control to direct operation of data transfer agent 400, and/or hardware associated with directing operation of data transfer agent 400. Logic may be hardware logic circuits and/or software routines. In one embodiment, data transfer agent 400 includes one or more applications 412, which represent code sequence and/or programs that provide instructions to control logic 410.

Data transfer agent 400 includes memory 414, which represents a memory device and/or access to a memory resource for storing data and/or instructions. Memory 414 may include memory local to data transfer agent 400, as well as, or alternatively, including memory of the host system on which data transfer agent 400 resides. Data transfer agent 400 also includes one or more interfaces 416, which represent access interfaces to/from (e.g., an input/output interface, application programming interface) data transfer agent 400 with regard to entities (electronic or human) external to data transfer agent 400.

Data transfer agent 400 also includes data transfer engine 420, which represents one or more functions that enable data transfer agent 400 to provide the zooming in and/or out on pages as described herein. Example modules that may be included in data transfer engine 420 include process memory module 430, compact container manager 440, link manager 450 and memory transfer module 460. As used herein, a module refers to routine, a subsystem, etc., whether implemented in hardware, software, firmware or some combination thereof.

Process memory module 430 operates to determine the status for each process and may also manage other parameters, for example, priorities associated with the processes or allowable memory consumption, etc. Process memory module 430 may control the status of the processes as well. Process memory module 430 may operate to freeze the processes when a higher priority process requires additional memory.

Compact container manager 440 operates to control the operation and functionality of the compact container as described herein. Compact container manager 440 may manage data structures within the compact container as well as links the operation and organization of the compact container to provide the functionality described herein.

Link manager 450 operates to follow and maintain links between data structures and memory locations, for example, between the compact container and the non-volatile memory. Link manager 450 may operate to locate data in non-volatile memory in response to a request for the data to be transferred back to RAM.

Memory transfer module 460 operates to control reads and writes to and from the non-volatile memory. In one embodiment, memory transfer module 460 causes data to be written to the non-volatile memory in a minimum number of write operations. Similarly, memory transfer module 460 causes data to be read from the non-volatile memory in a minimum number of reads. This may reduce wear on the non-volatile memory.

Figure 5:
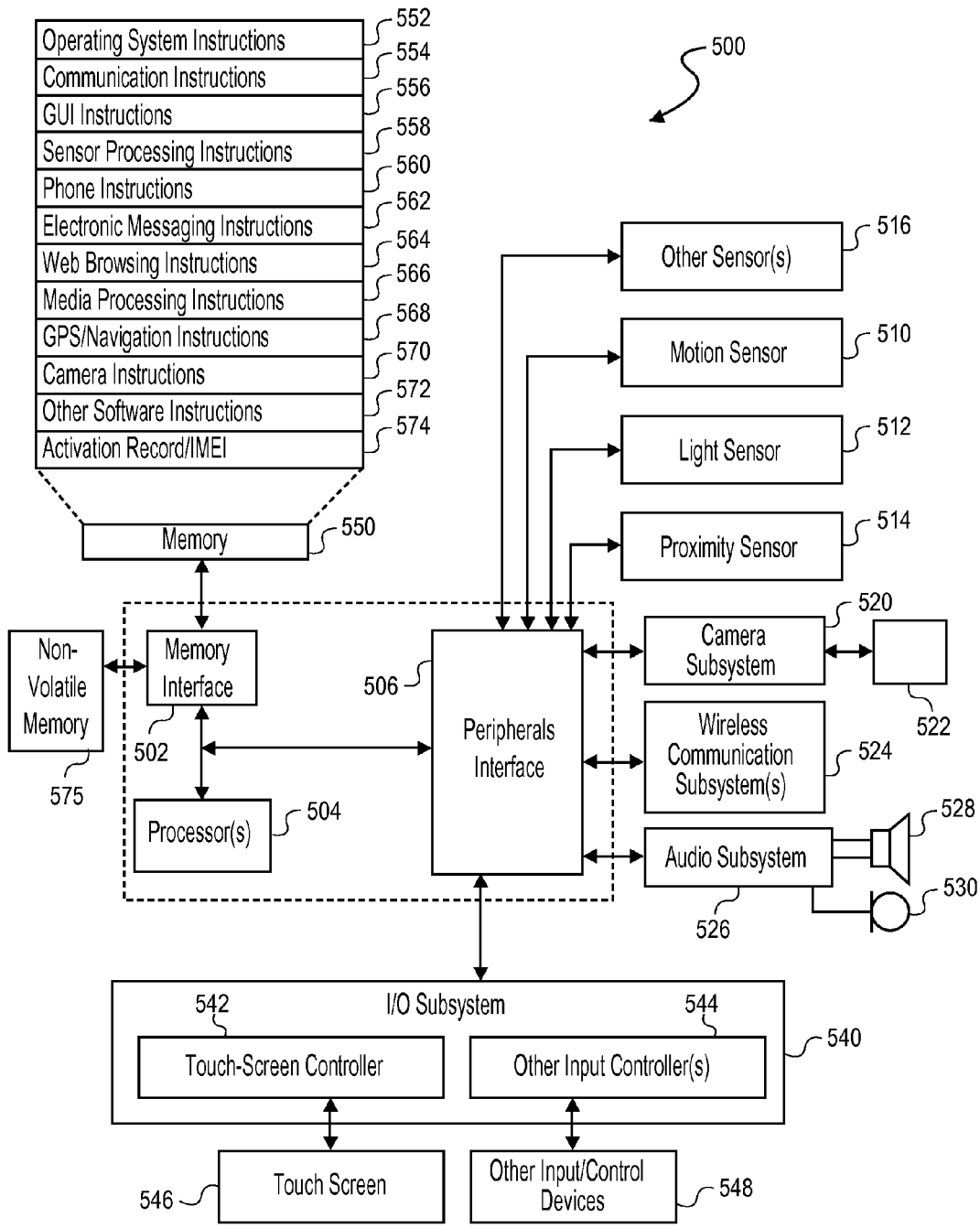
FIG. 5 is a block diagram of an example implementation of a mobile device.

FIG. 5 is a block diagram 500 of an example implementation of a mobile device. The mobile device can include memory interface 502, one or more data processors, image processors and/or central processing units 504, and peripherals interface 506. Memory interface 502, one or more processors 504 and/or peripherals interface 506 can be separate components or can be integrated in one or more integrated circuits. The various components in the mobile device can be coupled by one or more communication buses or signal lines.

Sensors, devices, and subsystems can be coupled to peripherals interface 506 to facilitate multiple functionalities. For example, motion sensor 510, light sensor 512, and proximity sensor 514 can be coupled to peripherals interface 506 to facilitate the orientation, lighting, and proximity functions. Other sensors 516 can also be connected to peripherals interface 506, such as a positioning system (e.g., GPS receiver), a temperature sensor, a biometric sensor, or other sensing device, to facilitate related functionalities.

Camera subsystem 520 and optical sensor 522 (e.g., a charged coupled device (CCD) or a complementary metal-oxide semiconductor (CMOS) optical sensor) can be utilized to facilitate camera functions, such as recording photographs and video clips.

Communication functions can be facilitated through one or more wireless communication subsystems 524, which can include radio frequency receivers and transmitters and/or optical (e.g., infrared) receivers and transmitters. The specific design and implementation of communication subsystem 524 can depend on the communication network(s) over which the mobile device is intended to operate. For example, a mobile device can include communication subsystems 524 designed to operate over a GSM network, a GPRS network, an EDGE network, a Wi-Fi or WiMax network, and a Bluetooth™ network. In particular, wireless communication subsystems 524 may include hosting protocols such that the mobile device may be configured as a base station for other wireless devices.

Audio subsystem 526 can be coupled to speaker 528 and microphone 530 to facilitate voice-enabled functions, such as voice recognition, voice replication, digital recording, and telephony functions.

I/O subsystem 540 can include touch screen controller 542 and/or other input controller(s) 544. Touch-screen controller 542 can be coupled to touch screen 546. Touch screen 546 and touch screen controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 546.

Other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of speaker 528 and/or microphone 530.

In one implementation, a pressing of the button for a first duration may disengage a lock of touch screen 546, and a pressing of the button for a second duration that is longer than the first duration may turn power to the mobile device on or off. The user may be able to customize a functionality of one or more of the buttons. Touch screen 546 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player, such as an iPod™. The mobile device may, therefore, include a 32-pin connector that is compatible with the iPod™. Other input/output and control devices can also be used.

Memory interface 502 can be coupled to memory 550. Memory 550 can include high-speed random access memory and/or non-volatile memory, such as one or more magnetic disk storage devices, one or more optical storage devices, and/or flash memory (e.g., NAND, NOR). Memory 550 can store operating system 552, such as Darwin, RTXC, LINUX, UNIX, OSX, WINDOWS, or an embedded operating system such as VxWorks. Operating system 552 may include instructions for handling basic system services and for performing hardware dependent tasks. In some implementations, operating system 552 can be a kernel (e.g., UNIX kernel). Memory interface 502 may also be coupled with non-volatile memory 575, which may be, for example, flash memory.

Memory 550 may also store communication instructions 554 to facilitate communicating with one or more additional devices, one or more computers and/or one or more servers. Memory 550 may include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes and instructions; camera instructions 570 to facilitate camera-related processes and functions; and/or other software instructions 572 to facilitate other processes and functions (e.g., access control management functions).

Memory 550 may also store other software instructions (not shown), such as web video instructions to facilitate web video-related processes and functions and/or web shopping instructions to facilitate web shopping-related processes and functions. In some implementations, media processing instructions 566 may be divided into audio processing instructions and video processing instructions, for example to facilitate audio processing-related processes and functions and video processing-related processes and functions, respectively. Activation record and International Mobile Equipment Identity (IMEI) 574 or similar hardware identifier can also be stored in memory 550.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method for migrating data between a volatile memory and a non-volatile memory, the method comprising:
   receiving a first request to migrate the data from the volatile memory to the non-volatile memory, wherein:
     the data corresponds to a first process having a first priority, and
     the first request is received when a second process having a second priority greater than the first priority requires additional memory;
   in response to receiving the first request:
     when a portion of the data corresponding to the first process can be designated for eviction from the volatile memory:
       designating the portion of the data for eviction from the volatile memory, freezing the first process,
       in a first memory space of the volatile memory, determining a first set of memory locations that correspond to the portion of the data that is designated for eviction,
       for each memory location of the first set of memory locations, storing, to an auxiliary memory that is separate and distinct from each of the volatile memory and the non-volatile memory, a pointer that refers to the memory location, for each pointer stored in the auxiliary memory, copying the portion of the data in the volatile memory referenced by the pointer to the non-volatile memory using one or more selected memory locations that are within a second memory space of the non-volatile memory, wherein the second process is allowed access to the portion of the data in the one or more selected memory locations associated with the non-volatile memory after the portion of the data is evicted from the volatile memory, and storing, in the auxiliary memory, information about the one or more selected memory locations;

receiving a second request to migrate the portion of the data from the non-volatile memory to the volatile memory, wherein the second request is triggered based on a reactivation of the first process that was previously frozen in response to receiving the first request; and in response to receiving the second request:

copying, based on the information about the one or more selected memory locations stored in the auxiliary memory, the portion of the data from the non-volatile memory to the volatile memory.

2. The method of claim 1, wherein the portion of the data cannot be designated for eviction from the volatile memory when the portion of the data is shared by the first process and a different process.

3. The method of claim 1, further comprising:
reclaiming the first set of memory locations corresponding to the first process; and
allocating the reclaimed first set of memory locations to the second process.

4. The method of claim 1, wherein the auxiliary memory is organized into a page of memory.

5. The method of claim 1, wherein the auxiliary memory is accessible via an operating system kernel address space.

6. The method of claim 1, wherein copying the portion of the data to the non-volatile memory is carried out in a single write operation.

7. The method of claim 1, wherein copying the portion of the data from the non-volatile memory to the volatile memory comprises:
identifying a second set of memory locations in the volatile memory to which the portion of the data can be written; and
copying the portion of the data from the non-volatile memory to the identified second set of memory locations in the volatile memory.

8. The method of claim 7, wherein the identified second set of memory locations is the same as the first set of memory locations to which the pointers stored in the auxiliary memory refer.

9. The method of claim 7, wherein copying the portion of the data from the non-volatile memory to the volatile memory comprises reading the portion of the data from the non-volatile memory in a single read operation.

10. The method of claim 1, wherein freezing the first process further comprises:
freezing the first set of memory locations to prevent the first process from changing the portion of the data associated with the first set of memory locations.

11. A non-transitory computer-readable medium storing instructions that, when executed by a processor included in a computing device, cause the computing device to carry out steps that include:

receiving a first request to migrate data from a volatile memory to a non-volatile memory, wherein:
the data corresponds to a first process having a first priority, and
the first request is received when a second process having a second priority greater than the first priority requires additional memory;

in response to receiving the first request:
when a portion of the data corresponding to the first process can be designated for eviction from the volatile memory:
designating the portion of the data for eviction from the volatile memory, freezing the first process,
in a first memory space of the volatile memory, determining a first set of memory locations that correspond to the portion of the data that is designated for eviction from the volatile memory,
for each memory location of the first set of memory locations, copying, to an auxiliary memory that is separate and distinct from each of the volatile memory and the non-volatile memory, the portion of the data that is stored with respect to the memory location,
copying the portion of the data in the auxiliary memory to the non-volatile memory using one or more selected memory locations that are within a second memory space of the non-volatile memory, wherein the second process is allowed access to the portion of the data in the one or more selected memory locations associated with the non-volatile memory after the portion of the data is evicted from the volatile memory, and
storing, in the auxiliary memory, information about the one or more selected memory locations;

receiving a second request to migrate the portion of the data from the non-volatile memory to the volatile memory, wherein the second request is triggered based on a reactivation of the first process that was previously frozen in response to receiving the first request; and in response to receiving the second request:
copying, based on the information about the one or more selected memory locations stored in the auxiliary memory, the portion of the data from the non-volatile memory to the volatile memory.

12. The non-transitory computer-readable medium of claim 11, wherein the portion of the data cannot be designated for eviction from the volatile memory when the portion of the data is shared by the first process and different process.

13. The non-transitory computer-readable medium of claim 11, wherein the steps further include:
reclaiming the first set of memory locations corresponding to the first process; and
allocating the reclaimed first set of memory locations to the second process.

14. The non-transitory computer-readable medium of claim 11, wherein the portion of the data is stored contiguously in the auxiliary memory.

15. The non-transitory computer-readable medium of claim 11, wherein the auxiliary memory is accessible via an operating system kernel address space.

16. The non-transitory computer-readable medium of claim 11, wherein the volatile memory is implemented using system random access memory (RAM), and the non-volatile memory is implemented using flash memory.

17. The non-transitory computer-readable medium of claim 11, wherein copying the portion of the data to the non-volatile memory is carried out in a single write operation.

18. The non-transitory computer-readable medium of claim 11, wherein the steps further include:
identifying a second set of memory locations in the volatile memory to which the portion of the data can be written; and
copying the portion of the data from the non-volatile memory to the identified second set of memory locations in the volatile memory.

19. The non-transitory computer-readable medium of claim 18, wherein the identified second set of memory locations is the same as the first set of memory locations.

20. The non-transitory computer-readable medium of claim 11, wherein the portion of the data is copied from the non-volatile memory to the volatile memory by reading the portion of the data from the non-volatile memory in a single read operation.

21. A system, comprising:
a volatile memory;
a non-volatile memory;
an auxiliary memory; and
a processor configured to cause the system to:
receive a first request to migrate data from the volatile memory to the non-volatile memory, wherein:
the data corresponds to a first process having a first priority, and
the first request is received when a second process having a second priority greater than the first priority requires additional memory;
in response to receiving the first request:
when a portion of the data corresponding to the first process can be designated for eviction from the volatile memory:
designate the portion of the data for eviction from the volatile memory, freeze the first process,
in a first memory space of the volatile memory, determine a first set of memory locations that correspond to the portion of the data that is designated for eviction from the volatile memory,
for each memory location of the first set of memory locations, store, to the auxiliary memory, a pointer that refers to the memory location,
for each pointer stored in the auxiliary memory, copy the portion of the data in the volatile memory referenced by the pointer to the non-volatile memory using one or more selected memory locations that are within a second memory space of the non-volatile memory, wherein the second process is allowed access to the portion of the data in the one or more selected memory locations associated with the non-volatile memory after the portion of the data is evicted from the volatile memory, and
store, in the auxiliary memory, information about the one or more selected memory locations;
receive a second request to migrate the portion of the data from the non-volatile memory to the volatile memory, wherein the second request is triggered based on a reactivation of the first process that was previously frozen in response to receiving the first request; and
in response to receiving the second request:
copy, based on the information about the one or more selected memory locations stored in the auxiliary memory, the portion of the data from the non-volatile memory to the volatile memory.

22. The system of claim 21, wherein the processor is further configured to cause the system to:
reclaim the first set of memory locations corresponding to the first process; and
allocate the reclaimed first set of memory locations to the second process.

23. The system of claim 21, wherein the processor is further configured to cause the system to:
identify a second set of memory locations in the volatile memory to which the portion of the data can be written; and
copy the portion of the data from the non-volatile memory to the identified second set of memory locations in the volatile memory.

24. The system of claim 23, wherein the identified second set of memory locations is the same as the first set of memory locations to which the pointers stored in the auxiliary memory refer.

25. The system of claim 21, wherein the processor is configured to cause the system to copy the portion of the data from the non-volatile memory to the volatile memory by reading the portion of the data from the non-volatile memory in a single read operation.

26. The system of claim 21, wherein the portion of the data cannot be designated for eviction from the volatile memory when the portion of the data is shared by the first process and a different process.

27. The system of claim 21, wherein copying the portion of the data to the non-volatile memory is carried out in a single write operation.

* * * * *